United States Patent [19]

Howe

[11] 4,385,373
[45] May 24, 1983

[54] DEVICE FOR FOCUS AND ALIGNMENT CONTROL IN OPTICAL RECORDING AND/OR PLAYBACK APPARATUS

[75] Inventor: Donald J. Howe, Rochester, N.Y.

[73] Assignee: Eastman Kodak Company, Rochester, N.Y.

[21] Appl. No.: 205,074

[22] Filed: Nov. 10, 1980

[51] Int. Cl.³ ................................................ G11B 7/12
[52] U.S. Cl. .................................................... 369/45
[58] Field of Search ............... 369/44, 45, 46, 111, 369/112, 100; 358/127, 128.5, 128.6, 335, 342; 350/6.3, 247, 484, 485, 486, 252, 255; 354/25

[56] References Cited

U.S. PATENT DOCUMENTS

| | | | |
|---|---|---|---|
| 3,650,187 | 3/1972 | Judin | 369/119 X |
| 3,794,410 | 2/1974 | Elliott | 350/285 |
| 3,924,063 | 12/1975 | Simons | 178/6.6 R |
| 3,932,700 | 1/1976 | Snopko | 178/6.6 R |
| 3,974,327 | 8/1976 | Van Dijk | 178/6.6 R |
| 3,997,715 | 12/1976 | Elliott | 178/6.6 R |
| 4,011,400 | 3/1977 | Simons et al. | 358/127 |
| 4,034,403 | 7/1977 | Compaan et al. | 358/128 |
| 4,059,841 | 11/1977 | Bricot et al. | 358/128 |
| 4,135,206 | 1/1979 | Kleuters et al. | 358/128 |
| 4,151,570 | 4/1979 | Ravizza et al. | 360/77 |
| 4,170,397 | 10/1979 | Botcherby et al. | 350/6.3 |
| 4,193,091 | 3/1980 | Kleuters et al. | 369/45 |
| 4,291,958 | 9/1981 | Frank et al. | 354/25 |
| 4,302,830 | 11/1981 | Hamaoka et al. | 369/45 |
| 4,303,324 | 12/1981 | Marcus | 350/255 X |

FOREIGN PATENT DOCUMENTS 1327503 8/1973 United Kingdom .

Primary Examiner—John H. Wolff
Assistant Examiner—Donald McElheny, Jr.
Attorney, Agent, or Firm—John D. Husser

[57] ABSTRACT

A device for controlling focus and alignment of a light beam, e.g. in apparatus for optical recording and playback with high density data storage media such as optical discs, includes a plurality of independently addressable piezoelectric bender elements which control the position of lens means of such apparatus. The bender elements can be selectively addressed with electric fields to effect focus and/or tracking alignment adjustments of the active light beam.

9 Claims, 9 Drawing Figures

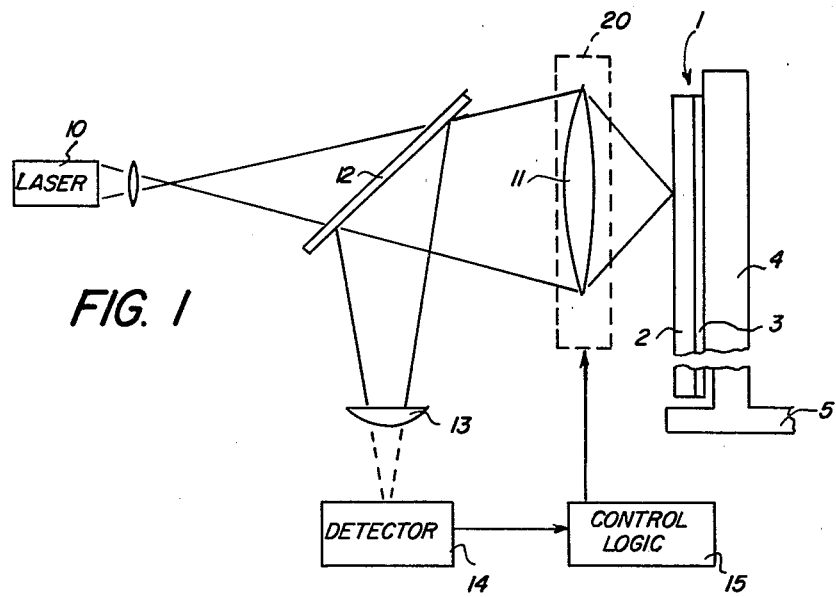
FIG. 1
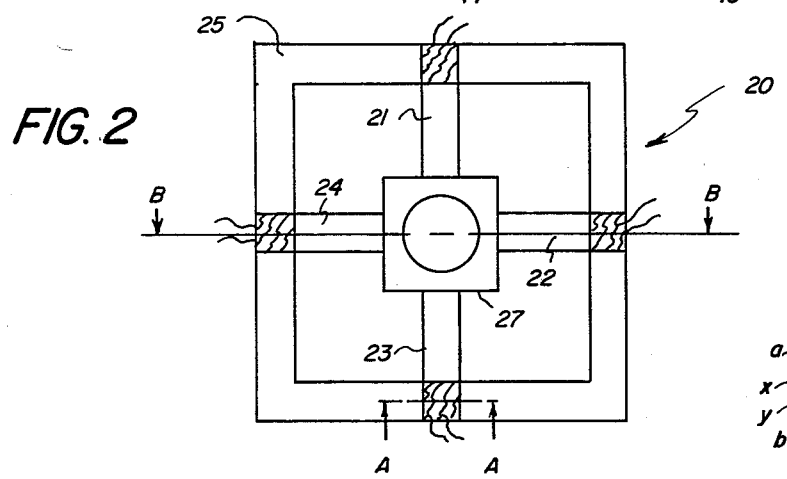
FIG. 2
FIG. 3
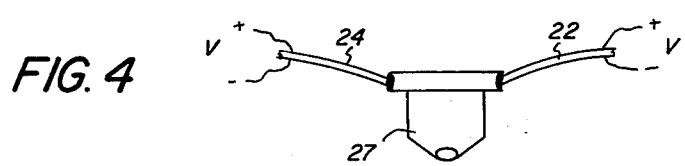
FIG. 4
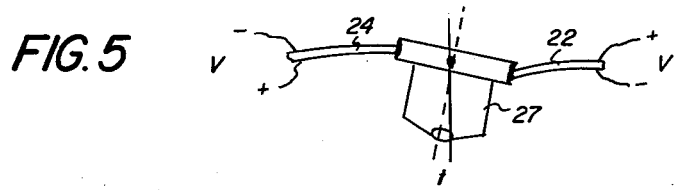
FIG. 5

DEVICE FOR FOCUS AND ALIGNMENT CONTROL IN OPTICAL RECORDING AND/OR PLAYBACK APPARATUS

BACKGROUND OF THE INVENTION

1. Field of the Invention

The present invention relates to devices for controlling the optical focus and alignment of optical beams, such devices being particularly useful in apparatus adapted to optically write and read with optical data-storage media, e.g., optical discs.

2. Description of the Prior Art

Various apparatus utilize means for manipulating an optical light path, e.g., to focus and/or align a beam of light such as a laser beam. One illustrative system is an optical record and playback apparatus which optically writes and reads information in the form of tracks of very small (e.g., a micron or less in size), optically detectable marks on a storage medium. In the writing and reading of such marks it is necessary to maintain the active light beam precisely focused at a predetermined plane of the information media. Such media, typically in the form of a rotatable disc, are moved, e.g. rotated, relative to the active light beam to effect scanning of the beam along tracks of the media; and it is necessary also that the beam be properly aligned relative to the track position both in writing and reading operations.

Thus, in the above-described and other analogous applications, servo mechanisms often are provided to maintain the precise focus and alignment that is required for proper operation. Such mechanisms typically will include sensor systems which detect improper focus or misalignment of the active light beam(s). In optical disc systems such misalignment can include radial non-alignments (improper position of the beam in a direction radial to the center of rotation for the disc) and tangential non-alignments (improper position of the beam in a direction forward or backward along the concentric or spiral tracks of the disc).

Signals from such sensor systems typically are fed to electromechanical transducers, which adjust the position of one or more of the elements that define the beam's optical path, to correct the improper focus or misalignment of the light beam. One conventional type of transducer for providing such adjustment is an electro-magnetic transducer incorporating a loudspeaker-type coil which is adapted to move an armature that is connected to a lens or reflective element of the beam's path defining means. U.S. Pat. No. 4,135,206 discloses a system wherein a lens barrel is supported by a resilient element for movement normal to the record medium surface (to allow focus adjustment in response to first coil means located near one end of the lens barrel) and for tilting movement about a point near the bottom of the lens barrel (to allow radial and tangential tracking adjustment in response to four other coils located around the opposite end of the lens barrel). All required adjustments can be accomplished by this system; however, it is relatively complex in construction and therefore costly to fabricate and bulky in form.

Piezoelectric bender elements have recently been developed in forms that are relatively compact and inexpensive to fabricate, and it has been suggested that these elements may be useful in controlling the movement of mirrors to effect beam adjustment in such optical systems. Also commonly assigned U.S. patent application Ser. No. 193,771, now U.S. Pat. No. 4,291,958, entitled "Camera With Electronic Flash and Piezoelectric Lens Motor" and filed Oct. 3, 1980, in the names of L. F. Frank and J. K. Lee and U.S. patent application Ser. No. 194,323, now U.S. Pat. No. 4,303,324, entitled "Annular Piezoelectric Plastic Bender Lens Motor" and filed Oct. 6, 1980, in the name of M. A. Marcus disclose various advantageous piezoelectric bender configurations for controlling focus in photographic apparatus. The present invention follows the approach of simplifying focus and tracking control of such optical systems by the use of piezoelectric bender structures.

SUMMARY OF THE INVENTION

Thus, it is an object of the present invention to provide improved piezoelectric bender configurations for providing focus and alignment adjustments in an optical apparatus.

More specifically, it is an object of the present invention to provide in such apparatus a simple and compact transducer structure for supporting a lens element and for providing focus and alignment adjustments of the lens element in response to electrical correction signals.

One particularly useful application of the present invention is in combination with optical write/read apparatus in which a beam is intended to be focused accurately upon recording media, and, in one aspect, the present invention provides novel structure for focus adjustment and tracking (radial or tangential) alignment of such a light beam. It is a further feature of the present invention that it allows such focus and tracking adjustment to be made concurrently in a simplified manner.

In general, these objectives and functional features of the present invention are implemented by positioning an objective lens of such an optical apparatus by means of a plurality of separately addressable piezoelectric bender elements and providing control means for separately or concurrently addressing such elements to provide focus and/or tracking adjustment of a light beam.

BRIEF DESCRIPTION OF THE DRAWINGS

Further objects and advantages of the present invention will be illustrated by the subsequent detailed description of preferred embodiments which is made with reference to the attached drawings in which:

FIG. 1 is a schematic illustration of an exemplary optical disc apparatus of the type in which the present invention can be incorporated;

FIG. 2 is a top view of one embodiment of optical control device according to the present invention;

FIG. 3 is a cross-sectional view taken along the line A—A of FIG. 2;

FIGS 4 and 5 are cross-sectional views, taken along the line B—B of FIG. 2, showing different operative states of the optical control device;

DETAILED DESCRIPTION OF THE PREFERRED EMBODIMENTS

Figure 6:
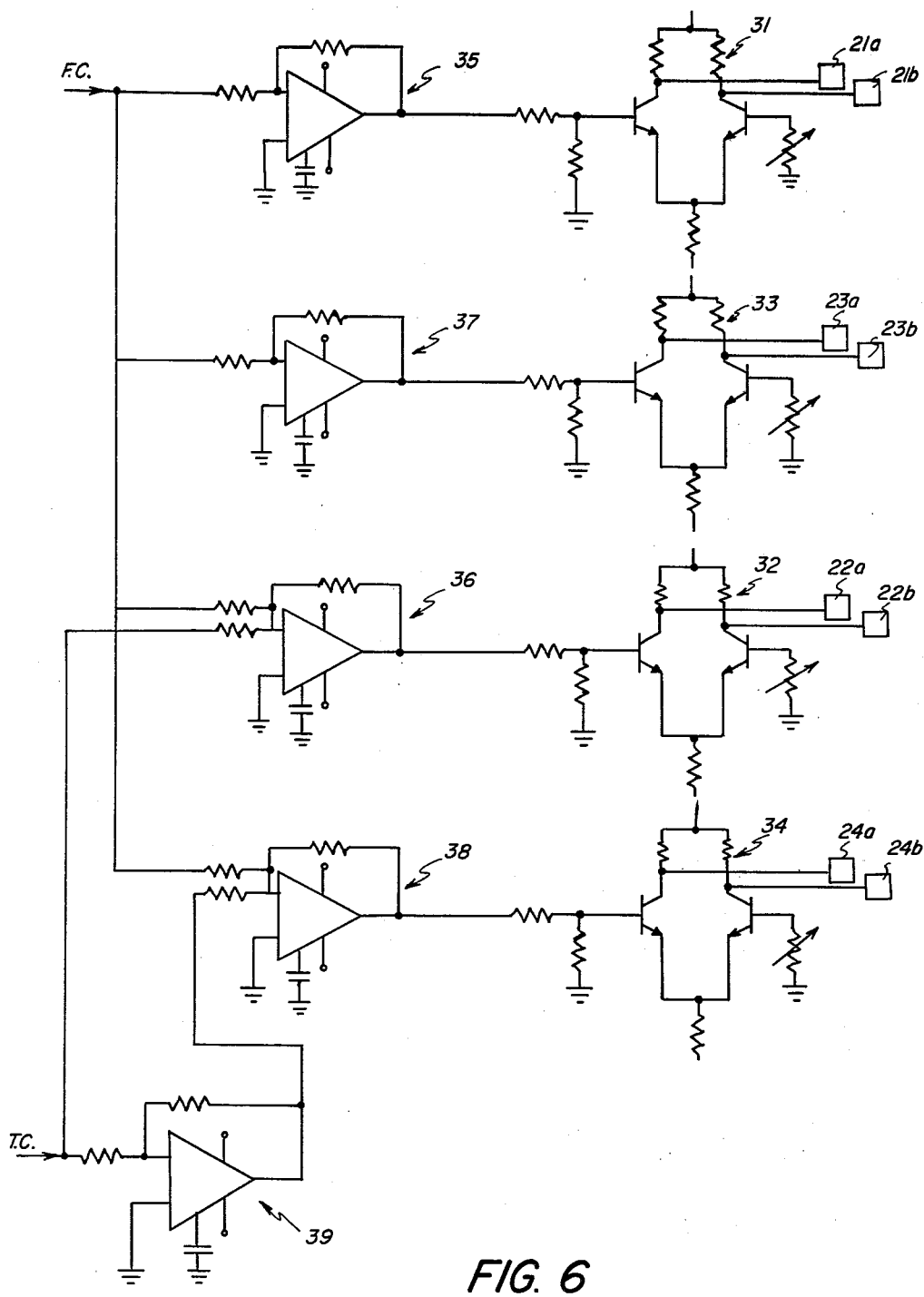
FIG. 6 shows an exemplary circuit for driving the device shown in FIG. 2.

Referring first to FIG. 1, a typical device that can be used for reading an optical disc 1 is shown. In this instance the disc 1 is of the reflective type comprising a recording layer 2 and a reflective support 3. The recording layer carries surface deformations arranged along circular or concentric tracks in an information pattern so that when the tracks of the disc are scanned with a reading light beam, the contrast of light reflected therefrom will vary to provide an information signal. It will be appreciated that the present invention can also be used for reading optical discs of the transmissive type and for control of a recording light beam as well as a reading light beam. The disc 1 is supported on a platen 4 which is rotatable about shaft 5.

During rotation of the disc 1, light from laser 10 is directed onto the disc tracks in a tightly focused spot by objective lens 11, which is of high numerical aperture. Light reflected back from the disc 1 passes back through lens 11 and is directed by beamsplitter 12 towards optical element 13, which is configured to direct the reflected light to detector 14 in one of several known patterns determined by the nature of the particular detection system utilized.

That is, the detector 14 can be one of the many kinds known in the art and its particular configuration will depend upon the type of correction for which it is designed. U.S. Pat. Nos. 4,011,400; 4,034,403 and 4,059,841 illustrate different exemplary detection devices intended to sense errors in focus and tracking of the reading light spot and to provide electrical signals to electromechanical transducers for implementing correction of these errors. In some instances the focus or alignment detector can also function to receive the information signal. Alternatively, this function can be effected by another detection device that receives reflected light along a separate optical path. As shown, the detector 14 provides its electrical correction signal(s) to a control logic unit 15 which in turn provides appropriate corrective signals to a transducer 20 that is adapted to implement physical corrections. In accordance with one preferred embodiment of the present invention, the transducer 20 is a lens supporting array of separately-addressable piezoelectric benders, and one embodiment of such a transducer is shown in more detail in FIG. 2.

Piezoelectric bender elements are generally known in the art and have been proposed for use in various applications. For example, U.S. Pat. No. 3,794,410 discloses the use of one such element to move a mirror for fine tracking control in an optical disc system. Typical commercially available piezoelectric bender elements consist of two pieces of piezoelectric ceramic such as PZT (lead zirconate titanate) which has been poled by firing in an electric field. These are bonded together with opposing polarities so that when an electric field is applied, e.g. by means of electrode structures on the non-adjacent surfaces of the piezoelectric elements, one piece expands and the other contracts. This produces a bending moment. If one end of the bender element is clamped, the free end will deflect as a cantilever beam in a direction dependent on the direction of the applied field. The deflection of such a beam is given by $$Y = 3/2\, d_{31} \frac{L^2}{T^2}$$

where:
 Y=deflection
 L=length of beam
 T=thickness of beam
 $d_{31}$=piezoelectric coefficient in specific directions.

The piezoelectric coefficient is of the order of 80 to $270 \times 10^{-12}$ meters/volt for commonly available bender elements. The deflection is independent of the width of the beam, however, the stiffness or spring constant is proportional to the width. It is to be noted that the above description is of a two-piece flexure device, "Bimorph" being a trade name of Vernitron Corp. for such bender elements. Other similar bender devices can be constructed using more than two piezoelectric elements, i.e. multimorphs, or using only one such element, unimorphs. For a more complete description of the structural details of such bender elements, one may refer to an article by C. P. Germano entitled "Flexure Mode Piezoelectric Transducers", IEEE Transactions on Audio and Electroacoustics, Vol. AU-19, No. 1, March 1971.

Referring now to FIG. 2, the control device embodiment of the present invention shown there and denoted generally 20 comprises four separately addressable piezoelectric bender elements 21, 22, 23, 24. Each of those bender elements is secured in cantilever fashion at one end to a housing and attached at the free end to a lens mount 27 so as to support the lens in "spider" fashion within the housing 25. The lens could of course be supported in any other manner so long as it is movable by the bender elements. An enlarged cross section of bender 23 is shown in FIG. 3, and it can be seen that such element is of the Bimorph type having oppositely poled piezoelectric pieces x and y, with respective electrodes a and b respectively, which are couplable to a voltage source to provide an electric field across the bender element. These bender elements are of the series connected kind. Alternatively parallel connected elements can be used in which the piezoelectric pieces are poled in the same direction and a third electrode between the pieces allows the electric field to be applied in opposite directions with respect to the two layers.

Referring to FIG. 4, it can be seen that when a field of the same direction and magnitude is impressed across each of the elements 21-24, the lens can be caused to move up and down along its optical axis. This mode can be utilized to achieve focus adjustments of the lens.

FIG. 5 shows the device 20 when opposite polarity fields are applied to elements 22 and 24. In this mode the lens 27 is tilted so that the beam would move to the left (as viewed in FIG. 5). This mode is useful for beam tracking adjustments, e.g., radial alignment if the tracks were considered normal to the paper in the view of FIG. 5. It will be understood that a similar tilting in the direction normal to the paper in the view of FIG. 5 can be achieved by impressing opposite polarity fields on elements 21 and 23. Such a mode would be useful for tangential tracking corrections. The magnitude of the field across respective bender elements controls the extent of their deflection and thus the degree of lens movements in any of the above-described modes can be controlled in this manner.

When the detector 14, e.g. of the FIG. 1 apparatus, signals control logic 15 of focus or tracking errors, responsive outputs from control logic 15 address a bender element(s) with a field(s) appropriate to correct the sensed error. It will be understood that at least two of the correcting motions described above can be obtained simultaneously by combination of electrical signals appropriate for each separate correction.

One exemplary circuit for applying appropriate adjusting fields across elements 21-24, in response to signals from focus and tracking error detection devices, is shown in FIG. 6. As illustrated, the electrodes 21a, 21b-24a, 24b respectively of bender elements 21-24 are coupled respectively to output amplifiers 31-34. Each output amplifier provides the driving field to its respective bender element in response to signals from a respective one of operational amplifiers 35-38. The focus correction signal "F.C." from control logic 15 is applied directly to each of the operational amplifiers, to effect application of a "common" field change with respect to each of the bender elements 21-24, and a shift in movement in the lens such as shown in FIG. 4. A tracking correction signal "T.C." from control logic 15 is applied to diametrically opposed bender elements, e.g. 22 and 24. In the illustrated circuit, the tracking correction signal is applied directly to operational amplifier 36 for element 22, but is passed through an inverting operational amplifier 39 prior to input to operational amplifier 38, for bender element 24. Thus the tracking signals from amplifiers 36 and 38, in cooperation with output amplifiers 32 and 34 effect opposite field adjustments, but of the same magnitude, to bender elements 22 and 24. The resulting opposite-direction bending of elements 22 and 24 effects tilting of the lens with respect to its axis as shown in FIG. 5. As shown in FIG. 6, the tracking correction inputs to operational amplifiers 36 and 38 are combined with the focus correction signal inputs so that the adjustments shown in FIGS. 4 and 5 can be effected concurrently.

The following more detailed example of a device constructed generally as shown in FIG. 2 will be of assistance in understanding the practice of the invention. A focusing-tracking device for a 3 mm, 0/85 NA microscope objective was made in the configuration shown in FIG. 2. The supporting bender beams were made of Vernitron PZT-5H with an unsupported length of ¾ inch, a width of ⅜ inch, and a nominal thickness of 0.021 inch. When all four beams were driven by a transistor amplifier at ±200 volts, the axial displacement was measured as ±0.0055 inches (see FIG. 4). The resonant frequency considering only one beam and one-quarter the mass of the objective was calculated as 110 Hz. The measured value of the complete system was 120 Hz.

When two opposing beams were driven in opposite directions as in FIG. 5, the tracking motion "t" was measured as ±0.004 inches. This lateral motion is dependent upon the distance from the center of rotation to the nodal point of the lens, which in this case was the length of the lens mount, 15 mm. The angular rotation required for the lens is only 1/5 the angular deviation required when the tracking is accomplished by an angular deviation of the laser beam by a beam steering mirror, since the effective center of rotation in the latter mode is at the nodal point of the lens, and the lever arm is only 31 mm. The resonant frequency in this mode was measured as 160 Hz.

Figure 7:
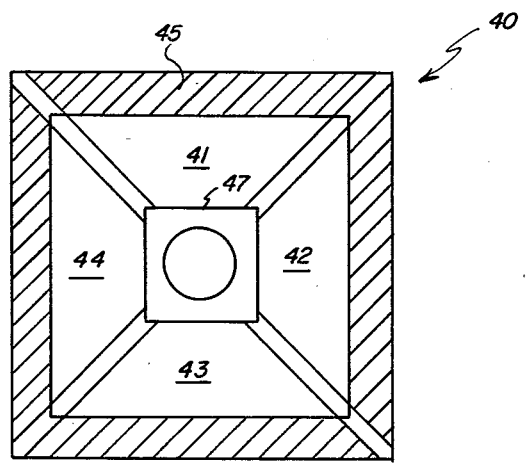
FIGS. 7-9 are top views of alternative embodiments of control devices according to the present invention.

In some instances it may be desirable to increase the resonant frequency to avoid unstability in the focus-tracking servo. One alternative embodiment 40 for this purpose is shown in FIG. 7. The resonant frequency is proportional to the square root of stiffness/mass. The mass can be reduced by removing metal from the microscope objective 47, and the stiffness of the control device can be increased by using triangular beams, such as bender elements 41-44, cantilevered from housing 45.

Figure 8:
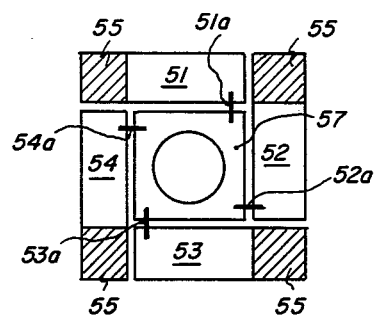

FIG. 8 illustrates a more compact embodiment 50 that is particularly suitable for focusing control adjustments. In this embodiment bender elements 51-54 are supported, in cantilever fashion on posts 55, symmetrically around the periphery of the supported lens. End portions of the bender elements are coupled to the lens assembly 57 by flexible pin elements 51a-54a at diametrically opposing positions on the lens assembly. Alternately, a flexible rubber adhesive (e.g. silicone rubber caulking) can be used to couple the lens and the bender elements.

Figure 9:
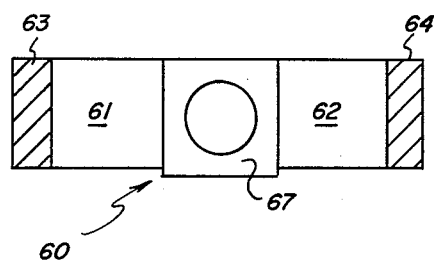

In some applications such as device 60 shown in FIG. 9, two beams 61 and 62 are sufficient for supporting lens 67 in accordance with the present invention. The beams anchored on one end from posts 63, 64 must be wide enough to provide torsional rigidity.

The invention has been described in detail with particular reference to certain preferred embodiments thereof, but it will be understood that variations and modifications can be effected within the spirit and scope of the invention.

What is claimed is:

1. Apparatus for controllably positioning lens means of the type having an optical axis and a principal plane, said apparatus comprising a plurality of independently addressable piezoelectric bender means mounted in cantilever-fashion around said lens means and having movable portions thereof coupled to peripheral portions of said lens means in a manner such that uniform displacement of all of said bender elements will effect adjustment of said lens means in a direction substantially perpendicular to the principal plane of said lens means and non-uniform displacement of said bender elements will effect tilting adjustment of the optical axis of said lens means.

2. The invention defined in claim 1 wherein said bender elements are uniformly constructed and mounted to provide the same variable displacement response to a varying electric field applied thereacross.

3. The invention defined in claim 1 further including focus control means for selectively applying electric focus adjustment fields across said bender elements in response to desired focus adjustments for said lens means and alignment control means for selectively applying electric alignment-control fields across said bender elements in response to desired adjustments of the optical axis of said lens means.

4. In optical apparatus of the type including lens means for directing light along its optical axis into focus at its focal plane, an improved device for adjustably positioning said lens means, comprising:
 (a) first and second piezoelectric bender elements which are independently electrically addressable, each of said elements being fixed at one end within said apparatus and having a cantilever portion which is free to move within said apparatus toward and away from said focal plane, the cantilever portions of said elements respectively being coupled to portions of said lens means that are diametrically opposite with respect to said optical axis; and
 (b) lens control means for selectively applying predetermined electric fields respectively across said bender elements to effect predetermined movements of respectively coupled portions of said lens means toward or away from said focal plane.

5. The invention defined in claim 4 wherein said binder elements are uniformly constructed and proportioned and coupled to said lens means at symmetrical locations so that application of generally equal fields to said bender elements by said lens control means effects equal displacments of the lens means portions coupled thereto.

6. The invention defined in claim 5 wherein said lens control means includes focus control means for effecting such equal displacements in a common direction and alignment control means for effecting such displacements in opposite directions.

7. The invention defined in claim 5 wherein said lens control means includes focus control means for effecting such displacements in a common direction, alignment control means for effecting such displacements in opposite directions and means for combining such displacements to effect concurrent focus and alignment control of said lens means.

8. The invention defined in claim 4 further including third and fourth piezoelectric bender elements which are independently electrically addressable by said lens control means, supported within said apparatus like said first and second elements and coupled respectively to the diametrically opposing lens means portions intermediate said first and second elements.

9. In apparatus having a light source for writing and/or reading information on a record medium, lens means for directing light from said source along an optical axis into focus as a spot generally coinciding with an information plane of such record medium, means for providing relative movement between said lens means and such record medium so that said spot scans along tracks of the record medium and sensing means for detecting and signalling focus deviations and tracking deviations, the improvement comprising:

(a) piezoelectric bender means which are independently electrically addressable, mounted in cantilever-fashion around said lens means and have movable portions thereof coupled to peripheral portions of said lens means in a manner such that uniform displacement of all of said bender elements, toward or away from said information plane, will effect focus adjustment of said lens means along its optical axis and non-uniform displacement of said bender elements, toward or away from said information, will effect tilting adjustment of said optical axis and tracking movement of said spot; and (b) control means, responsive to signals from said sensing means, for selectively applying electric fields to said bender elements to effect such tracking and focus adjustments of said lens means.

* * * * *